US008219778B2

(12) United States Patent
Palladino et al.

(10) Patent No.: US 8,219,778 B2
(45) Date of Patent: Jul. 10, 2012

(54) VIRTUAL MEMORY INTERFACE

(75) Inventors: Michael Palladino, San Carlos, CA (US); Carl Gyllenhammer, Scotts Valley, CA (US); Bendik Kleveland, Santa Clara, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 790 days.

(21) Appl. No.: 12/037,940

(22) Filed: Feb. 27, 2008

(65) Prior Publication Data

US 2009/0216964 A1    Aug. 27, 2009

(51) Int. Cl.
  *G06F 12/00* (2006.01)
  *G06F 9/26* (2006.01)
  *G06F 9/34* (2006.01)
(52) U.S. Cl. .............................. 711/203; 711/E12.058
(58) Field of Classification Search .................. None
  See application file for complete search history.

(56) References Cited

U.S. PATENT DOCUMENTS

| | | | |
|---|---|---|---|
| 5,497,476 A * | 3/1996 | Oldfield et al. ............... 711/112 |
| 5,590,287 A | 12/1996 | Zeller et al. |
| 5,802,399 A | 9/1998 | Yumoto et al. |
| 5,974,493 A | 10/1999 | Okumura et al. |
| 6,021,086 A | 2/2000 | Joffe |
| 6,088,740 A * | 7/2000 | Ghaffari et al. .................... 710/5 |
| 6,092,124 A * | 7/2000 | Priem et al. ..................... 710/23 |
| 6,282,587 B1 * | 8/2001 | Priem et al. ..................... 710/23 |
| 6,434,592 B1 * | 8/2002 | Cameron ......................... 718/108 |
| 6,691,180 B2 * | 2/2004 | Priem et al. ..................... 710/23 |
| 6,928,516 B2 | 8/2005 | Reuter |
| 7,142,477 B1 | 11/2006 | Tran |
| 7,152,131 B2 | 12/2006 | Saen et al. |
| 7,743,191 B1 * | 6/2010 | Liao ............................... 710/240 |
| 7,877,524 B1 * | 1/2011 | Annem et al. ................... 710/26 |
| 2001/0029556 A1 * | 10/2001 | Priem et al. ..................... 710/23 |
| 2003/0009642 A1 | 1/2003 | Takeshita |
| 2003/0177435 A1 * | 9/2003 | Budd et al. ...................... 714/776 |
| 2004/0267982 A1 * | 12/2004 | Jackson et al. .................. 710/52 |
| 2005/0007814 A1 | 1/2005 | Spencer |
| 2006/0150199 A1 * | 7/2006 | Callender ........................ 719/328 |
| 2006/0190689 A1 * | 8/2006 | Van Niekerk .................. 711/147 |
| 2007/0124407 A1 * | 5/2007 | Weber et al. .................... 709/212 |
| 2007/0156729 A1 * | 7/2007 | Shaylor ........................... 707/100 |
| 2008/0153541 A1 * | 6/2008 | Rakshani et al. ............. 455/552.1 |
| 2009/0006505 A1 * | 1/2009 | Scheer et al. ................... 707/206 |

OTHER PUBLICATIONS

Search report and written opinion in counterpart PCT/US2009/034820, mailed Jun. 29, 2009.

* cited by examiner

*Primary Examiner* — Edward Dudek, Jr.
*Assistant Examiner* — Ralph A Verderamo, III
(74) *Attorney, Agent, or Firm* — King & Spalding L.L.P.

(57) ABSTRACT

The embodiments that are described herein provide random access to individual data storage locations of a group of buffers, which may be scattered in the memory. These embodiments provide a virtual memory interface that applies virtual addresses in a flat memory linear addressing space as indices into the physical memory addresses that are ordered into a sequence in accordance with the group of buffers. In this way, these embodiments enable a device (e.g., a processor) to directly and sequentially access all of the scattered physical memory locations of a fragmented data item, such as a packet, without having to perform any memory segmentation or paging processes. In some embodiments, these accesses include both read and write accesses to the scattered data storage locations.

22 Claims, 9 Drawing Sheets

VIRTUAL MEMORY INTERFACE

BACKGROUND

This application relates generally to virtual memory interfaces, and more particularly to apparatus and methods for providing access to individual storage locations of buffers, which may be scattered in memory.

Data processing electronic devices typically include memory for storing data. A memory interface specifies a protocol that is used to access the individual data storage locations of a physical memory (e.g., a random access memory). These individual data storage locations are indexed by physical addresses in a physical address space. In some systems, a processor or user process operates with respect to virtual addresses (also referred to as "logical addresses") in a virtual address space, where the virtual addresses must be translated into the corresponding physical addresses before the data storage locations of the physical memory can be accessed. In these systems, the translation of virtual addresses to physical addresses typically involves determining mappings between the virtual addresses and the physical addresses from lookup translation tables, which are stored in memory.

Data processing typically involves moving data from a source memory to a destination memory. A processor may perform such a data transfer by reading the data from the source memory and subsequently writing the data to the destination memory. Alternatively, a direct memory access (DMA) engine may be used to transfer the data directly from the source memory to the destination memory, without having to be routed through the processor or other intervening device.

In a basic mode of operation, the DMA engine transfers a single contiguous block of data from the source memory to the destination memory. In this mode of operation, the processor configures the DMA engine with the starting address in the source memory, and starting address in the destination memory, and the amount of data to be transferred. Based on this information, the DMA engine controls the transfer of the contiguous data from the source memory to the destination memory.

In scatter gather mode of operation, the DMA engine transfers data in accordance with the physical addresses of the source and destination memory locations specified by the processor. This mode of operation typically is used to transfer data between contiguous physical addresses of a first memory and noncontiguous physical addresses of a second memory. For example, the gather function typically involves transferring noncontiguous blocks of data in the source memory to a contiguous area in the destination memory, whereas the scatter function typically involves transferring contiguous blocks of data from the source memory into noncontiguous blocks in the destination memory. The physical addresses of the source and destination memory addresses typically are specified by the processor in the form of a scatter gather list of elements (also referred to as "vectors"), where each of the elements contains the physical memory address and the length of a respective segment in the overall data transfer.

SUMMARY

In one aspect, the invention features apparatus that includes a memory and a direct memory (DMA) controller. The memory includes data storage locations addressable by physical addresses. The direct memory access (DMA) controller provides a virtual memory interface to the memory. The DMA controller is operable to apply a virtual address in a flat memory linear addressing space as an index into a sequence of the physical addresses that is ordered in accordance with a group of buffers.

In another aspect, the invention features apparatus that includes a memory, a wireless transceiver, logic, and a virtual memory interface. The memory includes data storage locations addressable by physical addresses. The wireless transceiver is operable to transmit and receive packets of data. The logic is operable to store packet data in buffers scattered in the memory. The logic also is operable to associate with each of the stored packets a respective list of buffer reference elements each of which includes (i) a respective buffer pointer to a respective buffer containing data of the packet and (ii) a size of the respective buffer. The virtual memory interface is operable to provide random access to individual ones of the data storage locations based on respective orderings of ones of the physical addresses into respective sequences in accordance with respective ones of the lists of buffer reference elements and on a respective indexing of each the ordered physical address sequences with consecutive virtual addresses in a flat memory linear addressing space.

In another aspect, the invention features a method in accordance with which a list of buffer reference elements is fetched. Each of the buffer reference elements includes (i) a respective buffer pointer corresponding to a respective one of physical addresses of data storage locations in a memory and (ii) a respective buffer size. Ones of the physical addresses are ordered into a sequence in accordance with the list of buffer reference elements. A virtual address is applied in a flat memory linear addressing space as an index into the sequence of the physical addresses to identify a target one of the data storage locations. Data transfer operations are performed with respect to the target data storage locations.

In another aspect, the invention features a method in accordance with which packets of data are wirelessly transmitted and received. Packet data are stored in buffers scattered in a memory that includes data storage locations addressable by physical addresses. A respective list of buffer reference elements is associated with each of the stored packets. Each of the buffer reference elements includes (i) a respective buffer pointer to a respective buffer containing data of the packet and (ii) a size of the respective buffer. Random access to individual ones of the data storage locations is provided based on respective orderings of ones of the physical addresses into respective sequences in accordance with respective ones of the lists of buffer reference elements and on a respective indexing of each the ordered physical address sequences with consecutive virtual addresses in a flat memory linear addressing space.

Other features and advantages of the invention will become apparent from the following description, including the drawings and the claims.

DETAILED DESCRIPTION

Figure 1:
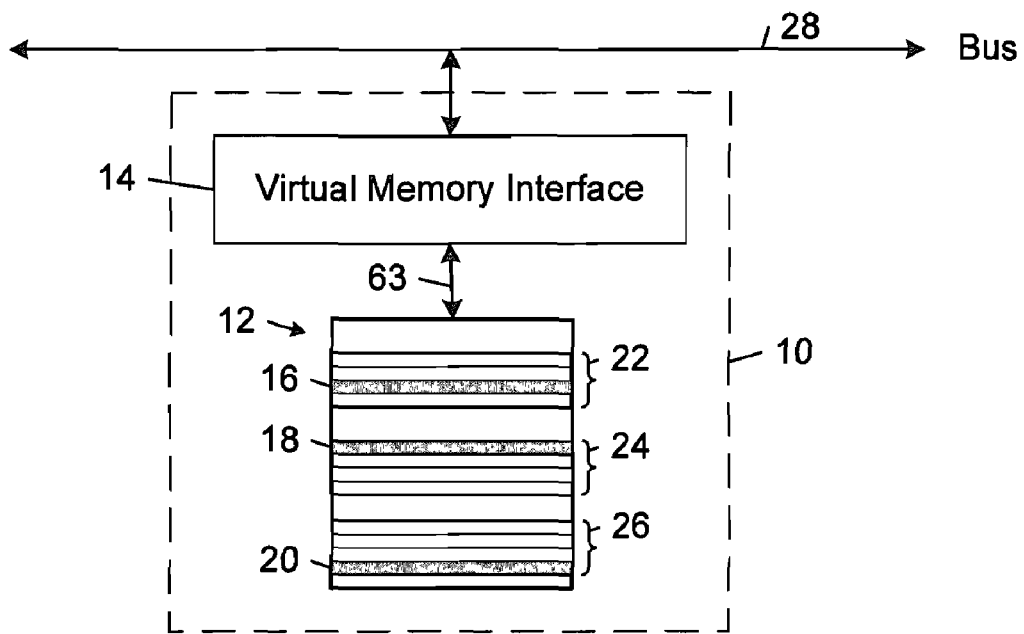
FIG. 1 is a block diagram of an embodiment of an apparatus that includes a virtual memory interface and a memory.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. TERMS

The terms "memory" and "physical memory" are used synonymously herein to mean an actual memory circuit that is wired for read and write access, as opposed to a "virtual memory" that is defined by a processor or software.

As used herein the term "physical address" means an address that is used to retrieve the contents of a physical memory. A "physical address space" is a space of physical addresses.

As used herein the term "virtual address" means a nonphysical address in a virtual address space defined by software, a processor, or a user process. Depending on the implementation, a virtual address space may or may not be scattered in memory.

As used herein the term "flat memory linear addressing space" means a virtual or physical memory addressing space that is linear, sequential and contiguous from a base memory address (typically address zero) to a final memory address that spans the entire addressing space.

As used herein the term "direct memory access" means capable of transferring data directly between memory locations on different memory devices without having to be routed through a processor or other intervening device.

As used herein the term "buffer" means a region of a physical memory, which may include one or more addressable data storage locations. The term "buffer pointer" means a pointer to a buffer. The pointer typically is the starting physical address of the buffer in a memory.

The terms "processor" and "microcontroller" are used synonymously herein to refer to an electronic circuit, usually on a single chip, which performs operations including but not limited to data processing operations, control operations, or both data processing operations and control operations.

The terms "packet" and "data packet" are used synonymously herein to mean a block of data formatted for transmission over a network. A packet typically includes a header, which contains addressing and other information, and a payload (e.g., message data).

II. OVERVIEW

The embodiments that are described herein provide random access to individual data storage locations of a group of buffers, which may be scattered in the memory. In particular, these embodiments provide a virtual memory interface that applies virtual addresses in a flat memory linear addressing space as indices into the physical memory addresses that are ordered into a sequence in accordance with the group of buffers. In this way, these embodiments enable a device (e.g., a processor) to directly and sequentially access all of the scattered physical memory locations of a fragmented data item, such as a packet, without having to perform any memory segmentation or paging processes. In some embodiments, these accesses include both read and write accesses to the scattered data storage locations.

These embodiments provide the virtual memory interface without imposing substantial overhead on the accessing device, thereby enabling resource-constrained devices to randomly access individual data units of buffers that are scattered in memory. These embodiments provide significant advantages when incorporated into embedded applications (e.g., wireless computer peripheral devices), which have significant power, memory, and computation resource constraints. For example, these embodiments may be incorporated into wireless transceiver modules to enable highly resource-constrained bus master devices and microcontrollers to be used in providing wireless connectivity. In this way, these embodiments enable low-cost and legacy electronic devices that use such bus master devices and microcontrollers to be readily equipped with wireless connectivity without requiring significant design modifications.

III. INTRODUCTION

FIG. 1 shows an embodiment of an apparatus 10 that includes a memory 12 and a virtual memory interface 14.

The apparatus 10 may be any type of electronic device that provides at least one of read access and write access to the memory 12. In some exemplary embodiments, the apparatus 10 is a special-purpose computer system that is designed to perform one or a few dedicated functions. In some embodiments, the apparatus 10 is a wireless transceiver module that is highly suitable for incorporation into wireless communications environments that have significant size, power, and cost constraints, including but not limited to handheld electronic devices (e.g., a mobile telephone, a cordless telephone, a portable memory such as a flash memory card and a smart card, a personal digital assistant (PDA), a video camera, a still image camera, a solid state digital audio player, a CD player, an MCD player, a game controller, and a pager), portable computers (e.g., laptop computers), computer peripheral devices (e.g., input devices, such as computer mice and keyboard), and other embedded environments. In addition to the virtual memory interface 14 and the memory 12, the apparatus 10 also may include a processor (or microcontroller) and mechanical parts.

The memory 12 may be any type of memory that is wired for read and write access. The memory 12 typically is a random access memory that includes individually addressable data storage locations 16, 18, and 20. In some exemplary implementations, the individually addressable data storage locations 16-20 are integer multiples of a byte (i.e., eight bits) in size. In the illustrated embodiments, the individually addressable data storage locations are one byte in size. In the illustrated embodiments, the data storage locations 16-20 are contained in a group of buffers 22, 24, 26, which are scattered in the memory 12. The group of buffers 22-26 may, for example, correspond to an ordered list of buffer addresses (or pointers) or a set of linked buffers.

As explained in detail below, the virtual memory interface 14 provides random access to the individually addressable data storage locations 16-20 of the memory 12. The virtual memory interface 14 communicates with other devices and components over an external input/output (I/O) bus 28, which may be a serial or parallel bus.

Figure 2:
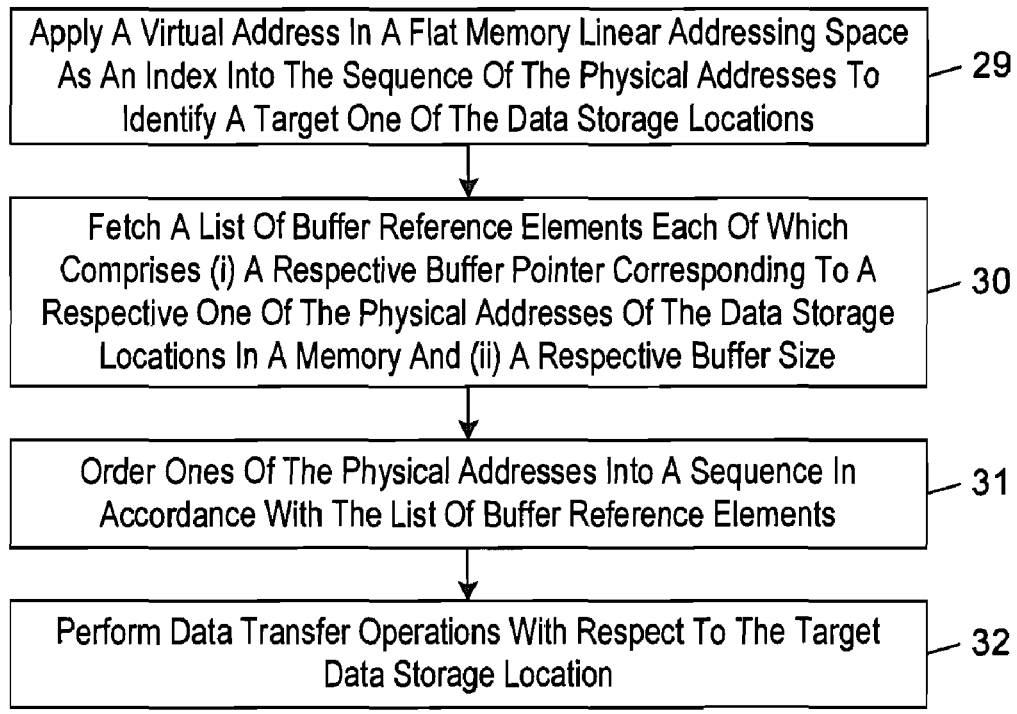
FIG. 2 is a flow diagram of an embodiment of a virtual memory interfacing method.

FIG. 2 shows an embodiment of a method that is implemented by the virtual memory interface 14. In accordance with this method, the virtual memory interface 14 applies a virtual address in a flat memory linear addressing space as an index into the sequence of the physical addresses to identify a target one of the data storage locations (FIG. 2, block 29). The virtual memory interface 14 fetches a list of buffer reference elements (FIG. 2, block 30). The buffer reference element list defines a respective group of buffers that has been allocated for a particular purpose. Each of the buffer reference elements includes (i) a respective buffer pointer corresponding to a respective one of the physical addresses of the data storage locations in the memory 12 and (ii) a respective buffer size. The virtual memory interface 14 orders (i.e., arranges) ones of the physical addresses into a sequence in accordance with the list of buffer reference elements (FIG. 2, block 31). The virtual memory interface 14 performs data transfer operations with respect to the target data storage locations (FIG. 2, block 32). Among the types of data transfer operations that the virtual memory interface 14 might perform are read operations, write operations, and copy operations.

Figure 3:
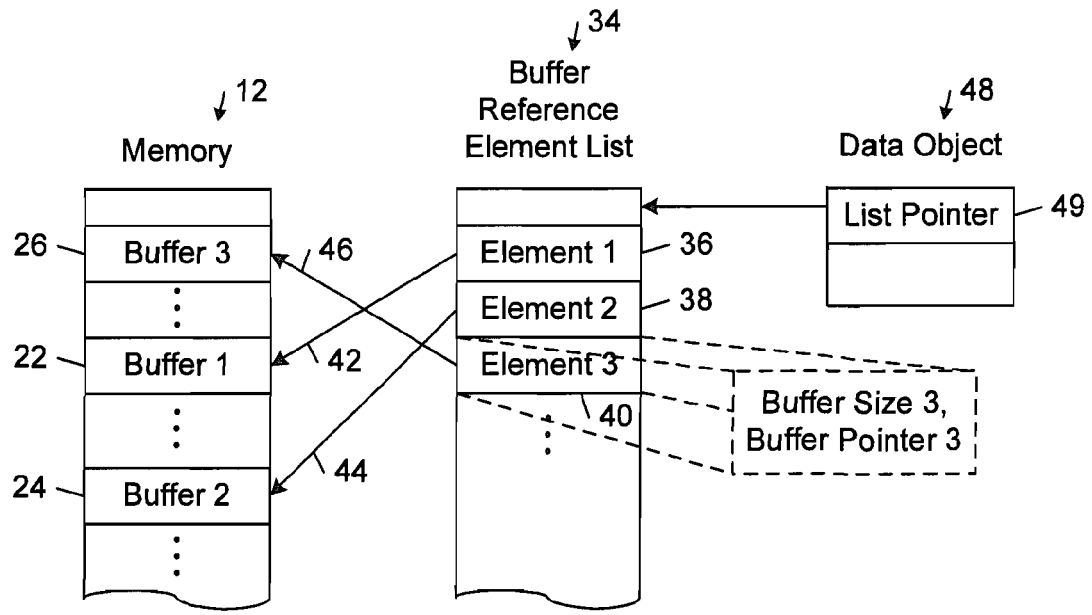
FIG. 3 is a diagrammatic view of embodiment of a list of buffer reference elements that includes buffer pointers to buffers scattered in a memory.

FIG. 3 shows an embodiment of a list 34 of buffer reference elements 36, 38, 40 that respectively specify the locations of the buffers 22-26 that are scattered in the memory 12 (see FIG. 1). Each of the buffer reference elements 36-40 includes (i) a respective buffer pointer 42, 44, 46 to a respective one of the buffers 22, 24, 26, and (ii) a respective buffer size. Together, the buffer pointer and the buffer size of each element 56-40 specify the location of the respective buffer 22-26 in the memory 12. Each of the buffer pointers 42-46 typically corresponds to the starting physical address of the respective buffer 22-26 in the memory 12. The buffer reference element list 34 may be stored in the memory 12 or in another data storage structure. In some embodiments, the buffer reference element list 34 is referenced internally by a DMA descriptor (or data object) 48, which includes a list pointer 49 to the buffer reference element list 34. The DMA descriptor 48 also may include additional data relating to the data stored in the buffers 22-26. As explained in detail below, the list 34 of buffer reference elements typically is constructed based on a group of buffers that has been allocated for a particular purpose (e.g., to receive a particular data item, such as a data packet, or to reserve a specified amount of memory for random access reading, writing, or both reading and writing). The list 34 of buffer reference elements may be built after data is being written to a group of buffers that has been allocated to receive the data or it may be built prior to data writing (also referred to as "data filling"), in response to a request to write data to the memory 12.

Figure 4:
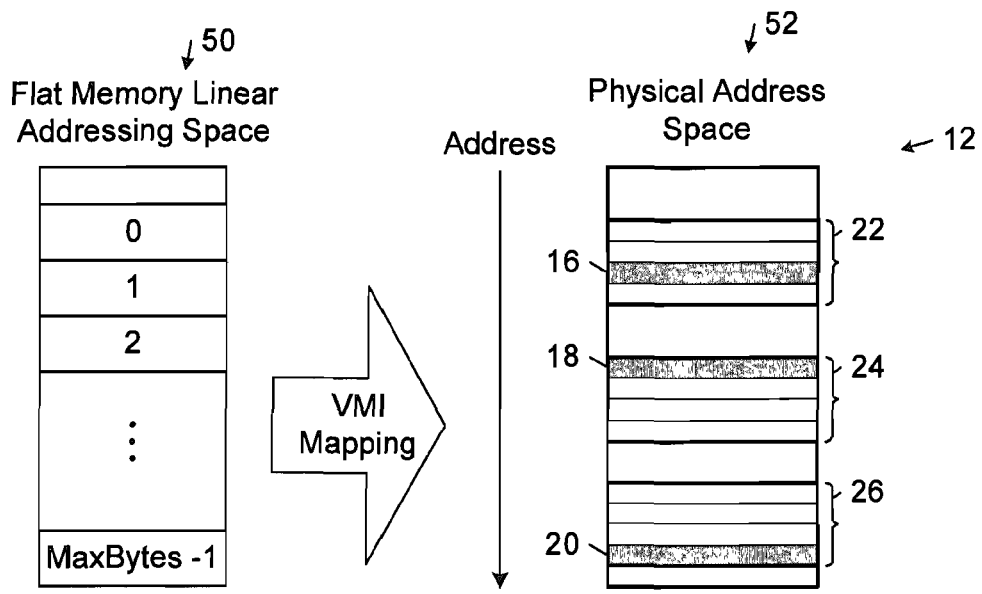
FIG. 4 is a diagrammatic view of a mapping between an embodiment of a flat memory linear addressing space and an embodiment of a physical address space.

As shown in FIG. 4, the virtual memory interface 14 accesses individual data storage locations of the memory 12 by mapping virtual addresses in a flat memory linear addressing space 50 to physical addresses in the physical address space 52 of the memory 12. This process is represented diagrammatically in FIG. 4 by the arrow labeled "VMI Mapping", where VMI stands for Virtual Memory Interface. The virtual addresses in the flat memory linear addressing space 50 are arranged in a contiguous, linear, sequential order from a base virtual address to a final virtual address, where the range of virtual addresses spans all of the data storage locations in the memory 12 that have been allocated for a particular purpose (e.g., to receive a particular data item or to reserve a specified amount of memory for random access) and that are included in the group of buffers. In the illustrated embodiment, the base virtual address is address 0 and the final virtual address is MaxBytes −1, where MaxBytes is the maximum number of bytes available (or allocated) to the virtual memory interface 14. As explained above, the buffers 22-26 may be scattered in the memory 12. Each of the buffers 22-26 contains one or more individually addressable data storage locations 16, 18, 20 of the memory 12. Each of these data storage locations 16-20 is accessed by a respective physical address in the physical address space 50. In the illustrated embodiment, each of the physical addresses is composed of a respective byte address.

Figure 5:
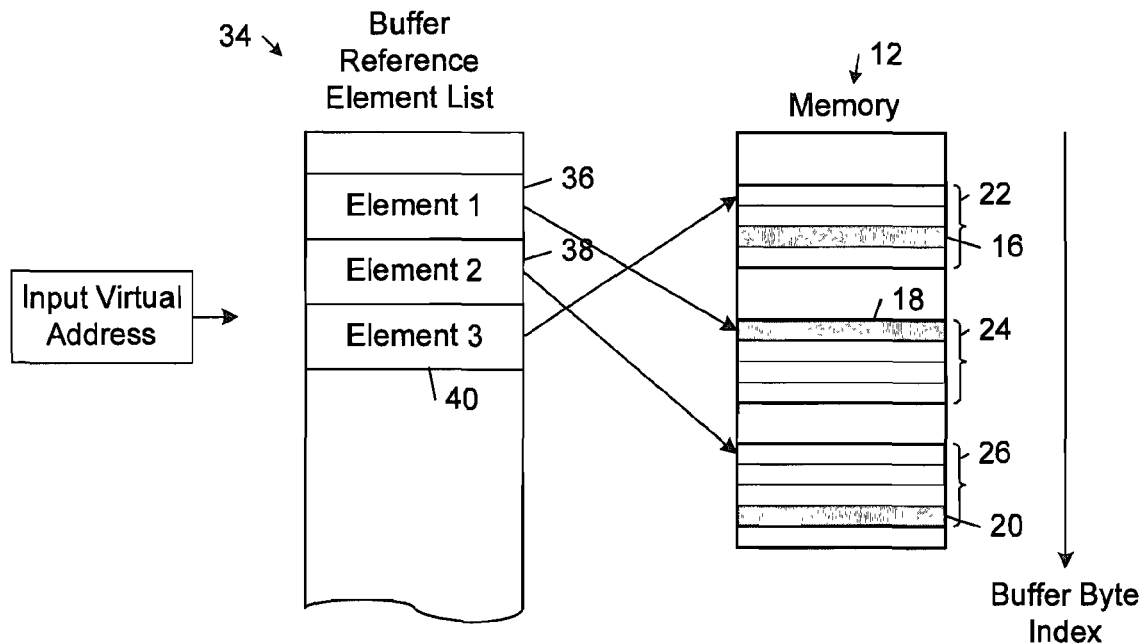
FIG. 5 is a diagrammatic view of an exemplary application of an input virtual address as an index into the data storage locations of buffers that are scattered a memory.

Referring to FIG. 5, the mapping that is performed by the virtual memory interface 14 enables a device or processor to directly and sequentially access all of the scattered physical memory locations of a data item fragment (e.g., a packet) that is stored in the buffers 22-26, without having to perform any memory segmentation or paging processes. In particular, the virtual memory interface 14 allows such a device or process to specify any data storage location of the memory 12 that is associated with a particular memory allocation (e.g., memory allocated to a particular data item, such as a data packet) using an input virtual address. In response, the virtual memory interface 14 applies the input virtual address as an index into the physical addresses of the memory 12 corresponding to the buffers that contain the segments of the data item. In this process, the virtual memory interface 14 orders these physical addresses into a sequence in accordance with the list of buffer reference items that is associated with the data item and indexes the ordered physical address sequence with consecutive ones of the virtual addresses in the flat memory linear addressing space.

In some embodiments, the virtual memory interface 14 maps the first virtual address to the physical address referenced by the buffer pointer of the first buffer reference element. The virtual memory interface 14 then maps each consecutive virtual address to the consecutive physical address in the first buffer. After all of the physical address in the first buffer have been mapped to respective virtual addresses, the virtual memory interface 14 maps the next consecutive virtual address to the physical address referenced by the buffer pointer of the next buffer reference element in the list 34. The virtual memory interface 14 repeats the process until the input virtual address has been mapped to a respective one of the physical addresses, which corresponds to the target data storage location in the memory 12. In the embodiment illustrated in FIG. 5, for example, the virtual memory interface 14 initially would map virtual address 0 to the starting physical address of the first buffer 24. The virtual memory interface 14 then maps each consecutive virtual address (i.e., virtual address 1, virtual address 2, and so on) to the consecutive physical addresses in the first buffer 24 (as indicated diagrammatically by the dotted line 54). The virtual memory interface 14 then repeats the process for each of the consecutive buffers in the buffer chain specified by the buffer reference list 34 until the input virtual address has been mapped to the physical address of the target data storage location in the memory.

IV. EXEMPLARY EMBODIMENT OF THE VIRTUAL MEMORY INTERFACE

The virtual memory interface 14 typically is implemented in a hardware circuit. In some embodiments, however, one or more methods of the virtual memory interface 14 are implemented in firmware, device driver, or software. In these embodiments, process instructions (e.g., machine-readable code, such as computer software) for implementing these methods, as well as the data that they generate, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 6:
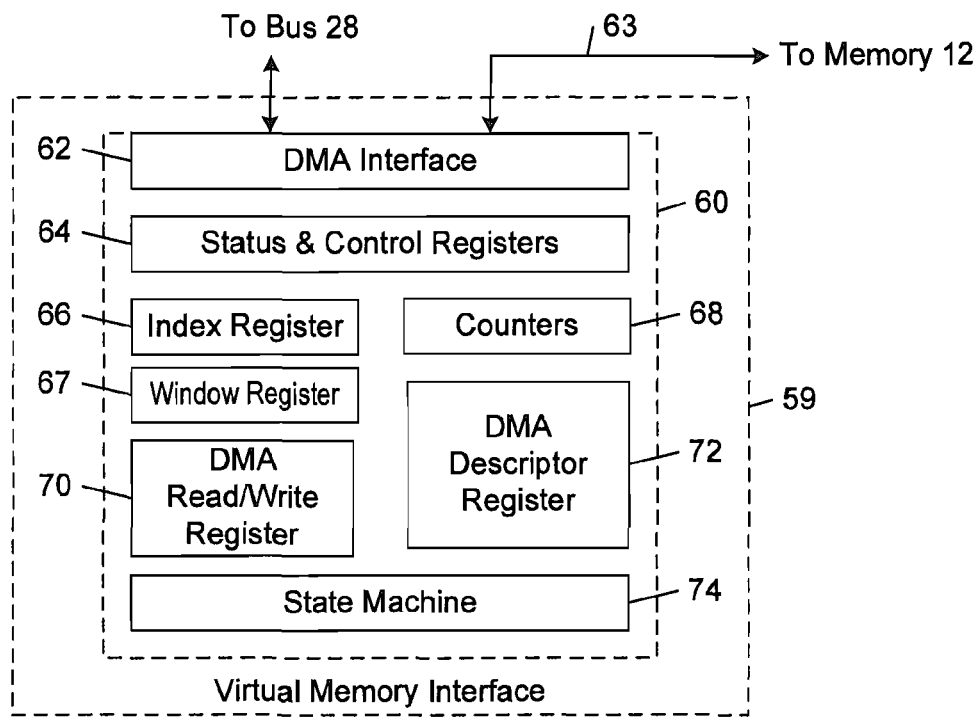
FIG. 6 is a block diagram of an embodiment of a virtual memory interface.

FIG. 6 shows an embodiment 59 of the virtual memory interface 14 that includes a direct memory access (DMA) controller 60 that provides a virtual memory interface to the memory 12. In this process, the DMA controller 60 applies an input virtual address in a flat memory linear addressing space as an index into a sequence of the physical addresses that is ordered in accordance with a group of buffers. As explained above, the group of buffers is referenced by a list of buffer reference elements each of which comprises (i) a respective buffer pointer corresponding to a respective one of the physical addresses and (ii) a respective buffer size.

The DMA controller 60 includes a DMA interface 62, status and control registers 64, an index register 66, a window register 67, one or more counters 68, a DMA read/write register 70, a DMA descriptor register 72, and a state machine 74.

The DMA interface 62 interfaces the DMA controller 60 to control devices, such as a bus master device or microcontroller, via the external I/O bus 28 (see FIG. 1) and interfaces the DMA controller 60 to the memory 12 via a memory bus 63 (see FIG. 1). The portion of the DMA interface 62 that connects to the external I/O bus 28 operates at the I/O bus clock frequency. In some embodiments, a bus master device uses this portion of the DMA interface 62 to configure the DMA controller 60 by commands after data has been written to the registers of DMA controller 60. The portion of DMA interface 62 that connects to the memory bus 63 operates at the memory clock frequency. The DMA controller 60 uses this portion of the DMA interface 62 to access the data buffers and the buffer reference element lists that are stored in the memory.

In some embodiments, the DMA interface 62 also interfaces the DMA controller 60 to internal components of the apparatus 10. For example, in some embodiments, the apparatus 10 includes physical layer (PHY) circuitry or medium access control (MAC) logic that interfaces with the DMA controller 60 via a request and acknowledge bus (not shown). Signals from this bus are used to inform the DMA controller 60 that the PHY circuitry or the MAC logic either has receive (Rx) data available for transfer, or that the PHY circuitry or the MAC logic is ready to receive transmit data in its internal buffer for transmission.

The status register stores status information that is read by a control device (e.g., a bus master device) to determine the present status of the DMA controller 60. In some embodiments, for example, the status register stores information that indicates the status of the DMA read/write register 70. The control register stores command strings that control the operation of the DMA controller 60.

The index register 66 stores input virtual addresses that are received in connection with requests to access data storage locations in the memory 12. The window register 67 provides read/write access to the virtual memory locations that are indexed by the index register 66. The counters 68 are used in the process of mapping the input virtual addresses to respective ones of the physical addresses of the data storage locations in the memory 12.

The DMA read/write register 70 stores the data that is to be transferred to or from the memory 12. Consecutive read operations to the read/write register 70 without applying a new index typically will make the read/write regions 70 appear as if it is accessing a FIFO memory.

The DMA descriptor register 72 stores the DMA descriptor 48 that is associated with a current data access request. Each DMA descriptor 48 (see FIG. 3) includes a respective list pointer 49 (see FIG. 3) to a respective buffer reference element list 34, as well as additional data relating to the data stored in the group of buffers 22-26 that are referenced by the DMA descriptor 48. The DMA controller 60 uses the list pointer 49 to retrieve one or more of the elements of the respective buffer reference element 34. The DMA controller 60 determines the data storage locations corresponding to input virtual addresses that are received in association with a memory access request by mapping the input virtual address to the physical addresses in the memory storing the corresponding ones of the buffers based on retrieved buffer reference elements.

The state machine 74 is a non-processor-based control logic block for the DMA controller 60. The state machine 74 controls or coordinates the operations of the DMA controller 60 in accordance with the commands stored in the control register. In particular, the state machine 74 typically includes memory and registers that are interconnected by gated logic blocks, which produce gated signals in response to the commands that are stored in the control register.

Each access request is associated with a reference to a particular DMA descriptor 48 that includes a list pointer 49 to a respective buffer reference element list 34 (see FIG. 3). The buffer reference element list 34 references a respective group of buffers that stores the data associated with the access request. The linked buffer chain typically is allocated by a component of the apparatus 10 and is stored in the memory 12. The DMA descriptor 48 typically also is stored in the memory 12.

The DMA controller 60 enables a bus master device to use virtual addresses in a flat memory linear addressing space 50 to specify individual target data storage locations of the memory 12 by mapping virtual addresses to physical addresses in the physical address space 52 of the memory 12. The bus master device can configure the DMA controller 60 to enable data transfer operations, such as reading data from the target data storage location or writing data to the target data storage location, based on such virtual address, FIG. 7 is a flow diagram of an embodiment of a method of mounting an object and its descriptor in response to a read or write request from a master bus device that is external to the apparatus 10 and interfaces with the bus 28 (see FIG. 1).

Figure 7:
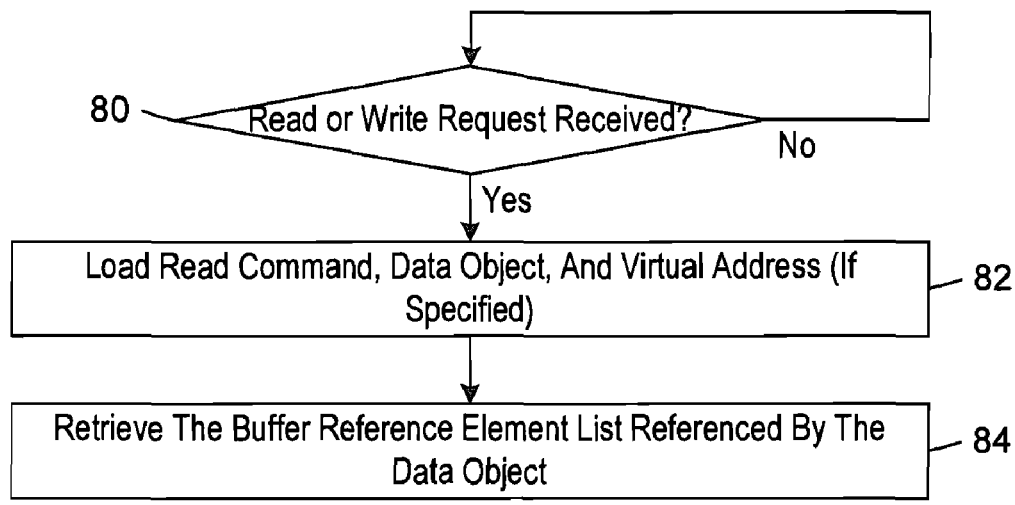
FIG. 7 is a flow diagram of an embodiment of a method of mounting an object and its descriptor in response to a read or write request from a master bus device.

The bus master device configures the DMA controller 60 by transmitting a read or write request to the DMA controller 60 (FIG. 7, block 80). The read or write request typically includes a read or write command, a DMA descriptor, and a destination address. During the first iteration of the method of FIG. 7, the initial source virtual address is assumed to correspond to the base virtual address (e.g., address 0) unless otherwise specified in the read request. In some cases, the destination address corresponds to the physical address of the window register 67 (see FIG. 6)

In response to the receipt of the read or write request (FIG. 7, block 80), the DMA controller 60 loads the read command into the control register, loads the DMA descriptor into the DMA descriptor register, and sets the source virtual address in the index register to the base virtual address (FIG. 7, block 82). The DMA controller 60 retrieves the buffer reference element list 34 that is referenced by the DMA descriptor (FIG. 7, block 84).

Figure 8A:
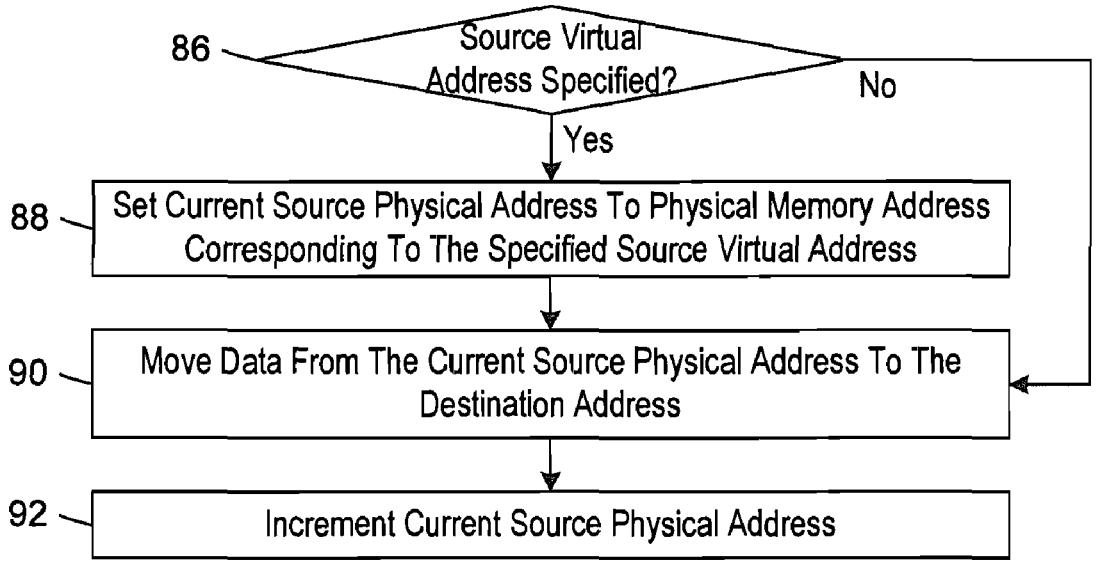
FIG. 8A is a flow diagram of an embodiment of a method by which the virtual memory interface of FIG. 6 handles a read request.

FIG. 8A shows an embodiment of a method by which the DMA controller 60 handles a read request from a bus master device after an object and its descriptor have been mounted as described above in connection with FIG. 7.

When the source virtual address is specified (FIG. 8A, block 86), the DMA controller 60 sets the current source physical address to the physical memory address corresponding to the specified source virtual address (FIG. 8A, block 88). In this process, the DMA controller 60 uses the virtual address to identify a target one of the physical addresses in a target one of the buffers and performs data transfer operations with respect to the target storage location at the identified physical address. In some embodiments, the DMA controller 60 maps the virtual address to a target one of the physical addresses by incrementing a buffer address list index and incrementing a buffer offset. In this process, the buffer address list index is incremented to an index value of the element in the buffer reference element list that includes a buffer pointer to a target one of the buffers encompassing the target physical address. The buffer offset then is incremented by an amount corresponding to an offset between a starting physical address of the target buffer and the target physical address. In cases in which the virtual address corresponds to a physical address in the first buffer, the DMA controller 60 maps the virtual address to a target one of the physical addresses having a sequence position offset from a reference position in the sequence by an amount corresponding to an amount by which the virtual address is offset from a reference position (e.g., the base virtual address) in the flat memory linear addressing space.

After mapping the input virtual address to the target source physical address, the DMA controller 60 moves data from the target source physical address to the destination address specified in the read request (FIG. 8A, block 90). In some embodiments, this process may involve transferring the target data from the target source physical address to the read/write register 70 and then transferring the target data from the read/write register 70 to the specified destination address.

After mapping the input virtual address to the target physical address, the DMA controller 60 as configured may automatically increment the current source physical address (FIG. 8A, block 92). In some embodiments, the DMA controller 60 increments the buffer offset to the next offset location corresponding to the next physical address after the target physical address. If the current count of the buffer offset exceeds the size of the current target buffer (i.e., the next physical address crosses the boundary of the current target buffer), the DMA controller 60 increments the buffer address list index to the index value of the next element in the buffer reference element list 34 and resets the buffer offset to zero, which corresponds to the starting physical address of the next buffer in the linked buffer chain.

If the source virtual address is not specified in the read request (FIG. 7, block 86), the DMA controller 60 moves the data from the current source physical address to the destination address (FIG. 7, block 90). The initial source virtual address is assumed to correspond to the base virtual address (e.g., address 0).

FIG. 8A shows an embodiment of a method by which the DMA controller 60 handles a write request from a bus master device after an object and its descriptor have been mounted as described above in connection with FIG. 7.

Figure 8B:
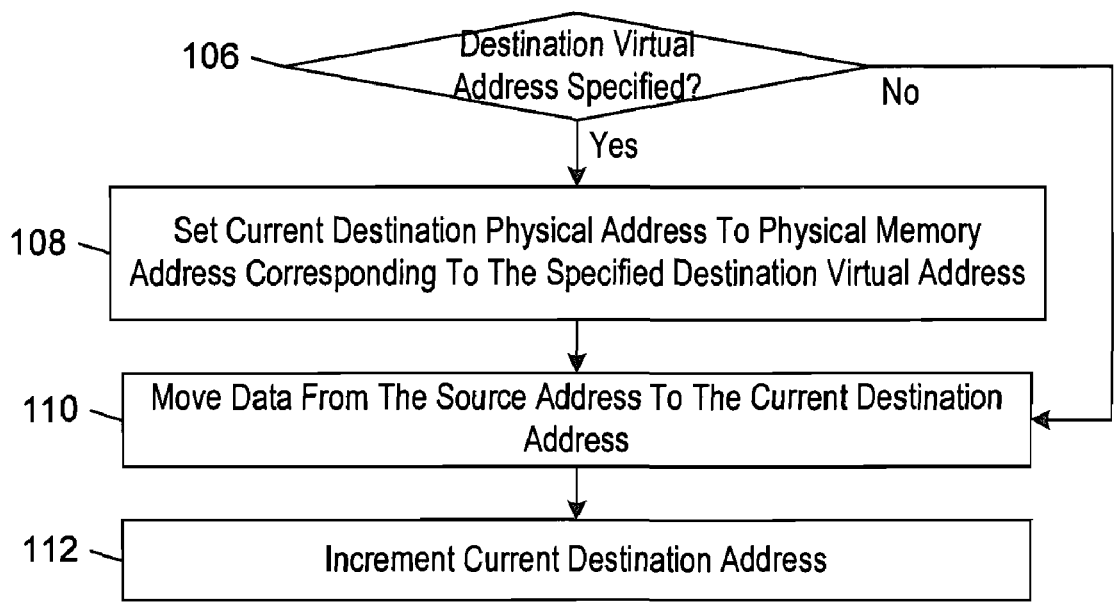
FIG. 8B is a flow diagram of an embodiment of a method by which the virtual memory interface of FIG. 6 handles a write request.

When the destination virtual address is specified (FIG. 8B, block 106), the DMA controller 60 sets the current destination physical address to the physical memory address corresponding to the specified destination virtual address (FIG. 8B, block 108). In this process, the DMA controller 60 uses the virtual address to identify a target one of the physical addresses in a target one of the buffers and performs data transfer operations with respect to the target storage location at the identified physical address. In some embodiments, the DMA controller 60 maps the virtual address to a target one of the physical addresses by incrementing a buffer address list index and incrementing a buffer offset. In this process, the buffer address list index is incremented to an index value of the element in the buffer reference element list that includes a buffer pointer to a target one of the buffers encompassing the target physical address. The buffer offset then is incremented by an amount corresponding to an offset between a starting physical address of the target buffer and the target physical address. In cases in which the virtual address corresponds to a physical address in the first buffer, the DMA controller 60 maps the virtual address to a target one of the physical addresses having a sequence position offset from a reference position in the sequence by an amount corresponding to an amount by which the virtual address is offset from a reference position (e.g., the base virtual address) in the flat memory linear addressing space.

After mapping the input virtual address to the target destination physical address, the DMA controller 60 moves data from the source address specified in the write request to the target destination physical address (FIG. 8B, block 110). In some embodiments, this process may involve transferring the target data from the specified source physical address to the read/write register 70 and then transferring the target data from the read/write register 70 to the target destination physical address.

After mapping the input virtual address to the target destination physical address, the DMA controller 60 as configured automatically may increment the current destination physical address pointed to by the window register (FIG. 8B, block 112). In some embodiments, the DMA controller 60 increments the buffer offset to the next offset location corresponding to the next physical address after the target destination physical address. If the current count of the buffer offset exceeds the size of the current target buffer (i.e., the next physical address crosses the boundary of the current target buffer), the DMA controller 60 increments the buffer address list index to the index value of the next element in the buffer reference element list 34 and resets the buffer offset to zero, which corresponds to the starting physical address of the next buffer in the linked buffer chain.

If the destination virtual address is not specified in the write request (FIG. 8B, block 106), the DMA controller 60 moves the data from the source address to the current destination physical address (FIG. 8B, block 110). The initial destination virtual address is assumed to correspond to the base virtual address (e.g., address 0).

The read and write methods of FIGS. 8A and 8B, presume that a group of buffers already has been allocated for the read/write request and that a list of buffer reference elements that point to the buffers has been created. The buffers typically are allocated in the memory 12 by a processor or a dedicated memory manager component in the apparatus 10 and the buffers typically are chained by a reference element list that typically is created by the processor or a separate DMA engine operating in the scatter gather mode.

Figure 9:
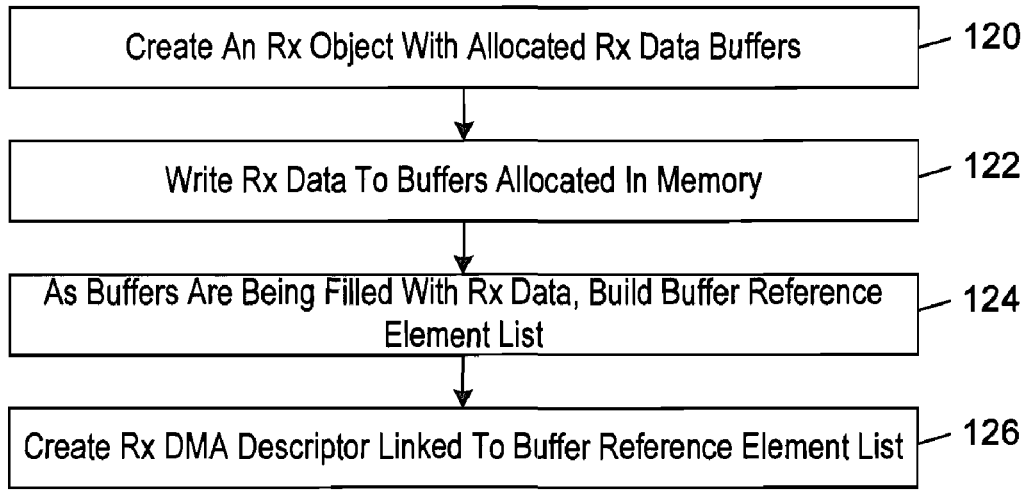
FIG. 9 is a flow diagram of an embodiment of a method of creating a list of buffer reference elements.

FIG. 9 shows an embodiment of a method of creating a list of buffer reference elements that enables the virtual memory interface 14 to provide read access to receive (Rx) data stored in the memory. In some embodiments, this method is performed by an implementation of the apparatus 10 that includes a receiver circuit, which stores the Rx data in the memory 12 for access by a remote processor. In operation, the receiver circuit responds to the receipt of Rx data by creating an Rx object with Rx data buffers that have been allocated in the memory 12 (FIG. 9, block 120) and writing the Rx data to the Rx data buffers (FIG. 9, block 122). The buffers, which have sizes that are determined by the particular format or protocol being used by the transceiver module, typically are scattered in the memory 12. The receiver circuit typically includes an Rx DMA controller, which handles the writing of the Rx data to the available buffers. The Rx DMA controller typically operates on a linked list of buffer descriptors each of which typically includes a descriptor status (e.g., available or unavailable), a word containing the actual length of the allocated buffer, and a pointer to the start of the data buffer in the memory 12. The list of buffer descriptors typically is stored in a descriptor queue (e.g., a circular or FIFO queue). After the Rx DMA controller fills the buffers with Rx data, a list of buffer reference elements is built (FIG. 9, block 124). The buffer reference element list typically is built by a local processor in the apparatus 10. The local processor executes software instructions to build the list of buffer reference elements, where each of the buffer reference elements includes (i) a respective buffer pointer corresponding to a respective one of physical addresses of data storage locations in the memory 12 and (ii) a respective buffer size. The local processor also creates an Rx DMA descriptor that is linked to the buffer reference element list (FIG. 9, block 126). The processor typically stores the buffer reference element list and the Rx DMA descriptor in the memory 12.

Figure 10:
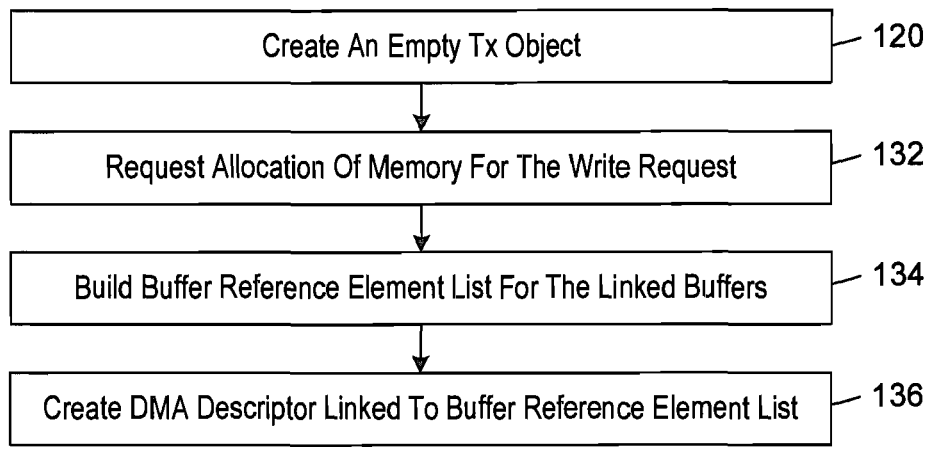
FIG. 10 is a flow diagram of an embodiment of a method of creating a list of buffer reference elements.

FIG. 10 is a flow diagram of an embodiment of a method of creating a list of buffer reference elements that enables the virtual memory interface 14 to provide write access to the memory 12. In operation, the virtual memory interface 14 responds to the receipt of a write command by creating an empty Tx object (FIG. 10, block 130) and requesting an allocation memory in an amount specified in the write request (FIG. 10, block 132). A local processor or a separate dedicated memory manager component in the apparatus 10 responds to the memory request by allocating a set of buffers that are sufficient to contain the memory specified in the request. The sizes of the buffers typically are determined by the particular format or protocol being used by the virtual memory interface 14 and typically are scattered in the memory 12. The local processor typically builds a list of buffer reference elements for the allocated buffers (FIG. 10, block 134). The local processor executes software instructions to build the list of buffer reference elements, where each of the buffer reference elements includes (i) a respective buffer pointer corresponding to a respective one of physical addresses of data storage locations in the memory 12 and (ii) a respective buffer size. The local processor also creates a DMA descriptor that is linked to the buffer reference element list (FIG. 10, block 136). The processor typically stores the buffer reference element list and the DMA descriptor in the memory 12. The resulting DMA descriptor can be used by the virtual memory interface 14 to service the received write request, as described above.

V. EXEMPLARY VIRTUAL MEMORY INTERFACE APPLICATION ENVIRONMENTS

Figure 11:
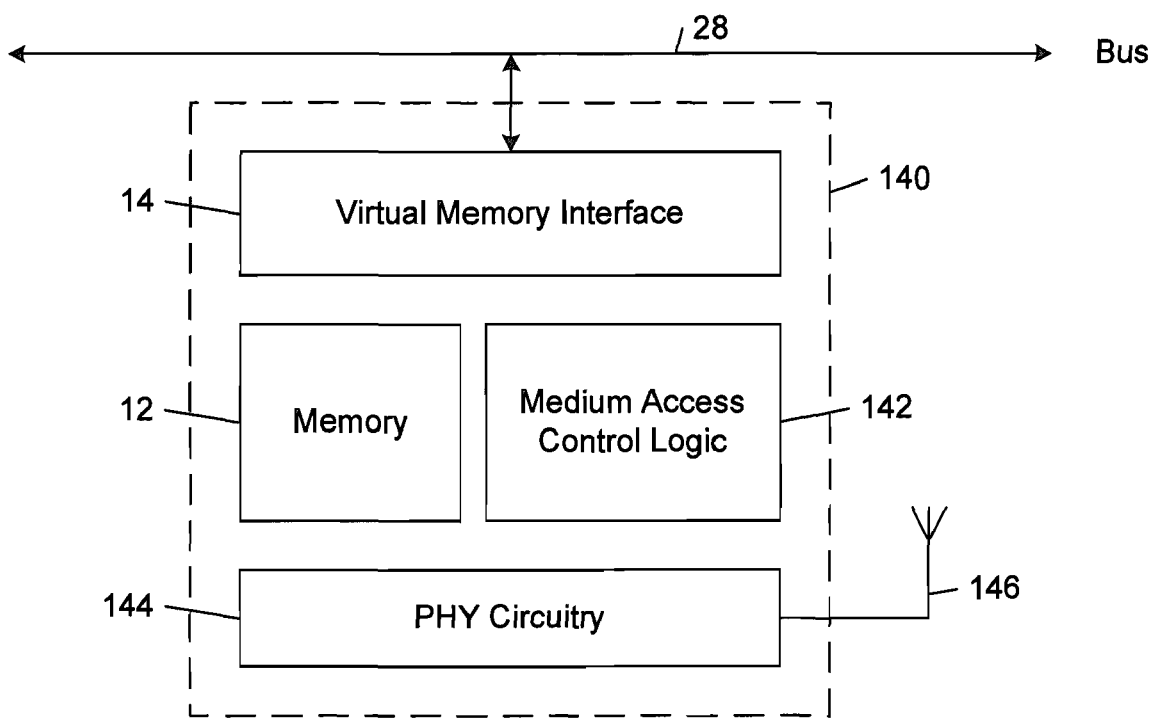
FIG. 11 is a block diagram of a wireless transceiver chip embodiment of the apparatus shown in FIG. 1.

FIG. 11 shows an embodiment of a wireless transceiver chip 140 that includes the memory 12, the virtual memory interface 14, medium access control (MAC) logic 142, and physical layer (PHY) circuitry 144.

The MAC logic 142 provides a process connection between a remote bus master device and the PHY circuitry 144. Among other functions, the MAC logic 142 partitions data signals that are received from the bus master device and the PHY circuitry 144 into frames, and passes output signals containing the frames to the PHY circuitry 144 and the remote bus master device. In some embodiments, the MAC logic 142 performs some or all of the MAC layer functions specified in one or more wireless communication protocols, such as the IEEE 802.11 (WiFi) protocol, the IEEE 802.15.1 (Bluetooth) protocol, or the IEEE 802.15.4 (Zigbee) protocol. In embodiments in which the MAC logic 142 does not perform all of the desired MAC layer functions, a driver running on a bus master device performs the remainder of the desired MAC protocol functions.

The MAC logic 142 typically is implemented, at least in part, by one or more discrete data processing components (or modules) that are not limited to any particular hardware, firmware, or software configuration. These data processing components may be implemented in any computing or data processing environment, including in digital electronic circuitry (e.g., an application-specific integrated circuit, such as a digital signal processor (DSP)) or in computer hardware that executes process instructions encoded in firmware, device driver, or software. In some embodiments, process instructions (e.g., machine-readable code, such as computer software) for implementing some or all the MAC protocol functions that are executed by the MAC logic 142, as well as the data it generates, are stored in one or more machine-readable media. In general, the term "machine-readable medium" refers to any medium capable carrying information that is readable by a machine. Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/ RAM, and CD-ROM/RAM.

The PHY circuitry 144 typically is implemented, at least in part, by a wireless transceiver, which typically includes an analog portion that interfaces with an antenna 146 and a digital portion that interfaces with the medium access control circuitry 142. The analog transceiver portion typically performs up-conversion of baseband transmit (TX) data signals that are received from the MAC logic 142 and outputs baseband receive (RX) data signals, which are down-converted versions of the signals received from the antenna 146. In some embodiments, the up- and down-conversion functions are performed using super-heterodyne techniques. In other embodiments, the up- and down-conversion functions are performed using direct conversion techniques.

Figure 12:
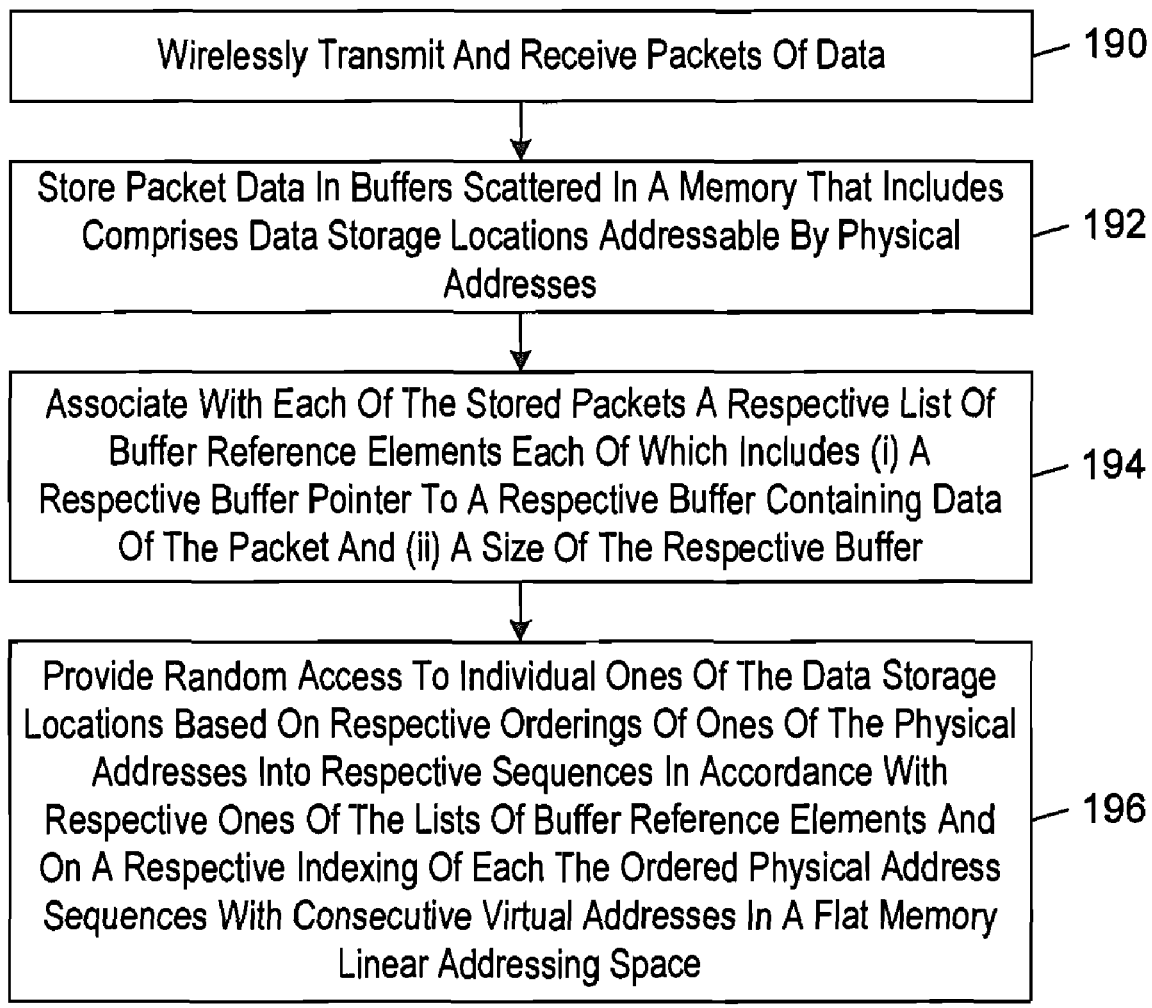
FIG. 12 is a flow diagram of an embodiment of a virtual memory interfacing method performed by the wireless transceiver chip shown in FIG. 11.

FIG. 12 shows an embodiment of a virtual memory interfacing method performed by the wireless transceiver chip 140 (see FIG. 11). In accordance with this method, the PHY circuitry 144 wirelessly transmits and receives packets of data (FIG. 12, block 190). The PHY circuitry 144 stores packet data in buffers scattered in the memory 12, which includes data storage locations addressable by physical addresses (FIG. 12, block 192). The local processor associates with each of the stored packets a respective list of buffer reference elements each of which includes (i) a respective buffer pointer to a respective buffer containing data of the packet and (ii) a size of the respective buffer (FIG. 12, block 194). The virtual memory interface 14 provides random access to individual ones of the data storage locations based on respective orderings of ones of the physical addresses into respective sequences in accordance with respective ones of the lists of buffer reference elements and on a respective indexing of each the ordered physical address sequences with consecutive virtual addresses in a flat memory linear addressing space (FIG. 12, block 196).

Figure 13:
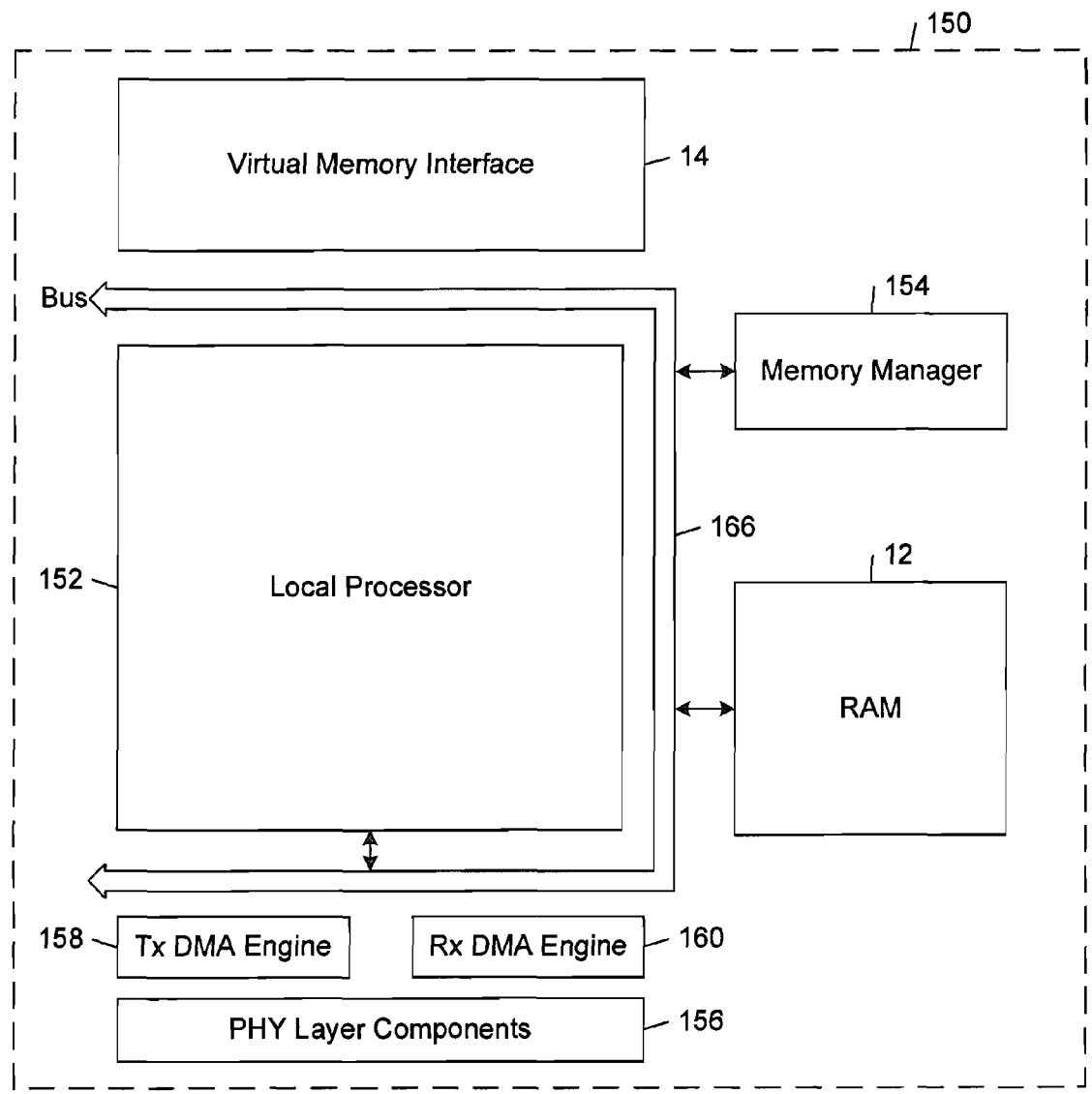
FIG. 13 is a block diagram of an embodiment of the wireless transceiver chip shown in FIG. 11.

FIG. 13 shows an embodiment 150 of the wireless transceiver chip 140 (see FIG. 11). The wireless transceiver chip 150 includes the memory 12, the virtual memory interface 14, a local processor 152, a memory manager 154, PHY layer components 156, a Tx DMA engine 158, an Rx DMA engine 160, and bus 166. In the illustrated embodiment, the memory 12 is a random access memory (RAM) chip. The local processor 152 typically is implemented by a standard processor or microcontroller. In some embodiments the local processor is a Motorola 68000 16/32-bit CISC microprocessor available from Freescale Semiconductor, Inc. The memory manager 154 is a hardware-based memory manager that allocates memory in the RAM 12 in accordance with a chunk memory allocation scheme. The PHY layer components include a wireless transceiver of the type described above in connection with the wireless transceiver chip 140. The Tx DMA engine 158 and the Rx DMA engine 160 typically are implemented by standard scatter gather DMA engines.

Figure 14:
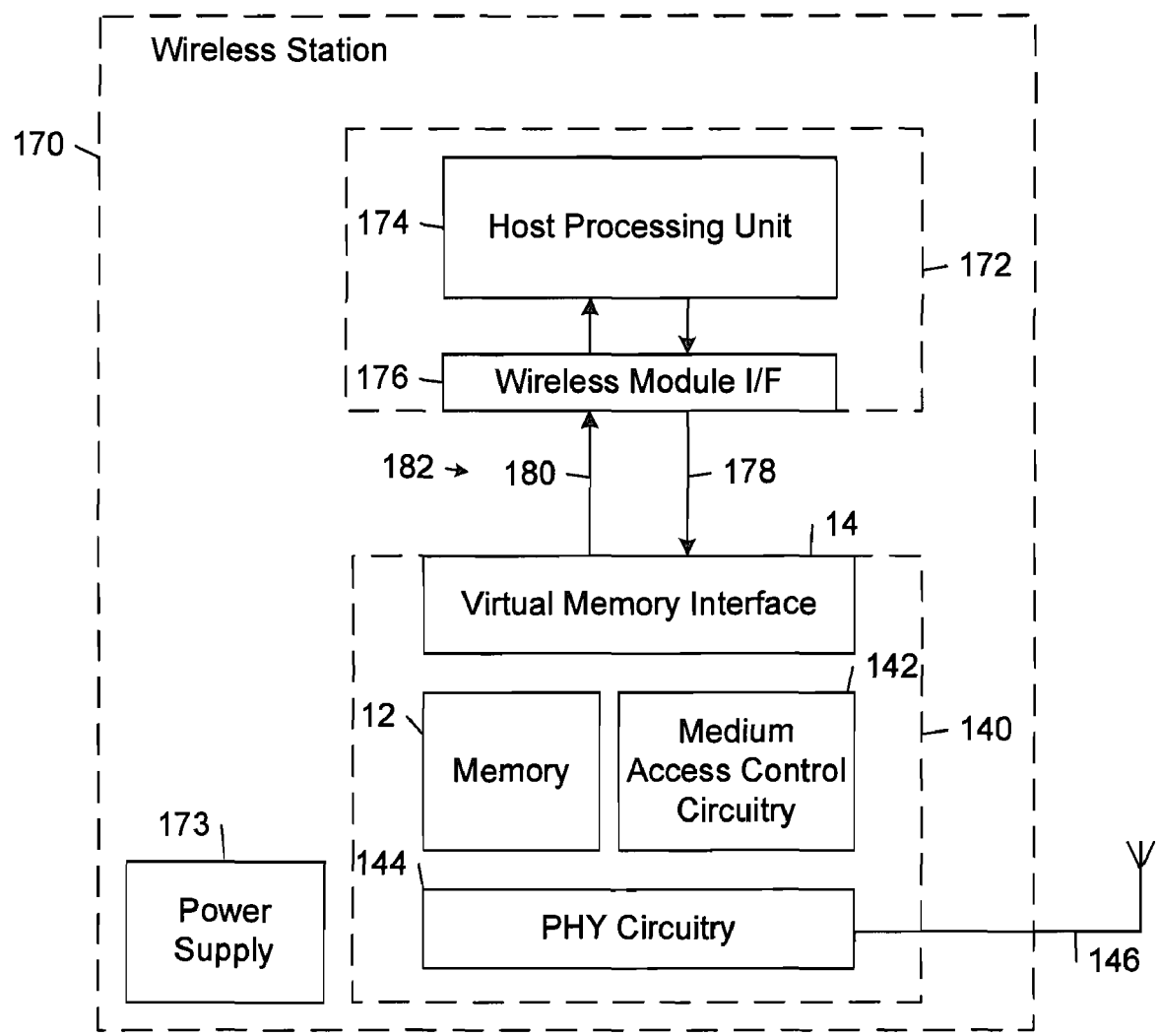
FIG. 14 is a block diagram of an embodiment of a wireless station that incorporates the wireless transceiver chip shown in FIG. 11.

FIG. 14 shows an embodiment of a wireless station 170. The wireless station 170 includes the wireless transceiver chip 140 (see FIG. 11), a host module 172, and a power supply 173. The power supply 173 typically is a battery, a fuel cell, or other electrical power store that can be recharged (e.g., an AC power adapter that is connected to AC utility power) or otherwise reconditioned.

In the illustrated embodiment, the host module 172 includes a host processing unit 174 and a wireless module interface (I/F) 176. The host processing unit 174 typically includes one or more processors, each of which may be in the form of any one of various commercially available processors. The host processing unit 174 also may include a read only memory (ROM) that stores a basic input/output system (BIOS) that contains start-up routines for the host module 172 and a random access memory (RAM). The host processing unit 174 transmits signals 178 to the wireless transceiver chip 140 and receives signals 180 from the wireless transceiver chip 140 via the wireless module interface 176. The host processing unit 174 typically executes various processes that control various aspects of the operation of the wireless transceiver chip 140. In some embodiments, the host processing unit 174 transmits to the wireless transceiver chip 140 requests to read from the memory 12 and write data to the memory. Such requests include Rx data read requests, Tx data write requests, and request to access the memory 12 for the purpose of other read/write operations.

The wireless module interface 176 is electrically coupled to the virtual memory interface 14 by a bus 182. In general, the bus 182 may be implemented in accordance with any type of data link protocol, including but not limited to the serial peripheral interface (SPI) bus protocol, the queued serial peripheral interface (QSPI) bus protocol, the I²C serial computer bus protocol, and the SDIO bus protocol. In some exemplary implementations, the bus is an SPI bus, which provides a synchronous serial data link between the host module and the wireless transceiver chip 140.

In the wireless station 170, the virtual memory interface 14 can be used by the host processing unit 174 to store in the memory 12 various data that are needed to achieve wireless connectivity, including TCP protocol control block data, MAC data, and driver data. In addition, in some embodiments, the host processing unit 174 can construct transmit (Tx) data packets in the memory via commands sent to the virtual memory interface 14. In this way, the virtual memory interface 14 enables the host processing unit 174 to use highly resource-constrained bus master devices and microcontrollers that do not have sufficient resources to implement such functionality. As a result, the virtual memory interface 14 enables low-cost and legacy electronic devices that use such resource-constrained bus master devices and microcontrollers to be readily equipped with wireless connectivity without requiring significant design modifications.

VI. CONCLUSION

The embodiments that are described herein provide a virtual memory interface that applies virtual addresses in a flat memory linear addressing space as indices into the physical memory addresses that are ordered into a sequence in accordance with the group of buffers. In this way, these embodiments enable a device (e.g., a processor) to directly and sequentially access all of the scattered physical memory locations of a fragmented data item, such as a packet, without having to perform any memory segmentation or paging processes. In some embodiments, these accesses include both read and write accesses to the scattered data storage locations.

Other embodiments are within the scope of the claims.

What is claimed is:

1. Apparatus, comprising:
    a memory comprising data storage locations addressable by physical addresses; and
    a virtual memory interface comprising a direct memory access (DMA) controller operable to interface to the memory and operable to receive a virtual address from a bus and to internally translate the virtual address into a physical address, wherein the virtual address is an address in a flat memory linear addressing space and the virtual address is applied as an index into a sequence of the physical addresses that is ordered in accordance with a group of buffers, wherein each buffer is defined by an address pointer which points to a physical reference address and a buffer length, wherein the DMA controller comprises:
    an index register configured to store the virtual address;
    a descriptor register configured to store a list pointer pointing to a buffer list associated with the virtual address;
    a state machine for controlling operations of the DMA controller and configured to directly determine the physical address,
    wherein under control of said state machine upon receipt of a data transfer request, the state machine stores an associated virtual address in the index register and stores an associated buffer list pointer in the descriptor register and determines one of a plurality of buffers from said buffer list according to the virtual address of the data transfer request by using said list pointer, wherein said state machine loads a physical reference address and buffer length through the selected buffer, determines the physical address by determining an offset within the selected buffer using said index register, and performs said data transfer request using said physical address.

2. The apparatus of claim 1, wherein in response to receipt of the virtual address, the DMA controller maps the virtual address to a target one of the physical addresses having a sequence position offset from the physical reference address in the sequence by an amount corresponding to an amount by which the virtual address is offset from a reference position in the flat memory linear addressing space.

3. The apparatus of claim 2, wherein in mapping the virtual address to the respective physical address, the DMA controller increments a buffer address list index to an index value of a target one of the buffers encompassing the target physical address and incrementing a buffer offset by an amount corresponding to an offset between a starting physical address of the target buffer and the target physical address.

4. The apparatus of claim 1, wherein in response to receipt of the virtual address in association with a data transfer request, the DMA controller uses the virtual address to identify a target one of the physical addresses in a target one of the buffers and performs data transfer operations with respect to the target storage location at the identified physical address.

5. The apparatus of claim 1, wherein the group of buffers is stored in said memory and accessed through the descriptor register in said DMA controller.

6. The apparatus of claim 5, wherein the DMA controller is operable to build a list of buffer reference elements after data is written to the buffers.

7. The apparatus of claim 5, wherein in response to a request to write data to the memory, the DMA controller builds the list of buffer reference elements in accordance with a group of buffers scattered in the memory.

8. The apparatus of claim 5, wherein the DMA controller comprises an index register storing a virtual address and a window register storing an offset to said virtual address.

9. The apparatus of claim 8, wherein the DMA controller comprises a plurality of counter registers used for mapping the virtual address to said physical address.

10. The apparatus of claim 1, further comprising a wireless transceiver operable to transmit and receive packets of data, wherein the received packet data is stored in buffers scattered in the memory and each of the received packets is associated with a respective list of buffer reference elements each of which comprises (i) a respective buffer pointer to a respective buffer containing data of the packet and (ii) a size of the respective buffer;

wherein, for each of the received packets, the DMA controller is operable to apply a virtual address in a respective flat memory linear addressing space as an index into a sequence of the physical addresses that is ordered in accordance with the respective buffer reference element list.

11. The apparatus of claim 10, wherein the memory, the DMA controller, and the wireless transceiver are implemented on a single semiconductor chip.

12. An integrated wireless transceiver device, comprising:
a memory comprising data storage locations addressable by physical addresses;
a wireless transceiver operable to transmit and receive packets of data;
logic operable to store packet data in buffers scattered in the memory and to associate with each of the stored packets a respective list of buffer reference elements each of which comprises (i) a respective buffer pointer to a respective buffer containing data of the packet and (ii) a size of the respective buffer; and
a virtual memory interface comprising a direct memory access (DMA) controller operable to interface to the memory and operable to receive a virtual address from a bus and to internally translate the virtual address into a physical address, wherein the virtual address is an address in a flat memory linear addressing space and the virtual address is applied as an index into a sequence of the physical addresses that is ordered in accordance with a group of said buffers, wherein the DMA controller comprises:
an index register configured to store the virtual address;
a descriptor register configured to store a list pointer pointing to a buffer list associated with the virtual address;
a state machine for controlling operations of the DMA controller and configured to directly determine the physical address,
wherein under control of said state machine upon receipt of a data transfer request, the state machine stores an associated virtual address in the index register and stores an associated list pointer in the descriptor register and selects one of a plurality of buffers from said buffer list according to the virtual address of the data transfer request by using said list pointer, wherein said state machine loads a physical reference address and buffer length through the selected buffer, determines the physical address by determining an offset within the selected buffer using said index register, and performs said data transfer request using said physical address.

13. The apparatus of claim 12, wherein
in response to receipt of a respective one of the virtual addresses in association with a data transfer request with respect to a particular packet, the virtual memory interface is operable to resolve the received virtual address to a target one of the physical addresses based on the respective indexing and to perform data transfer operations with respect to the data storage location at the target physical address.

14. The apparatus of claim 12, wherein the virtual memory interface is operable to provide a bus master device with random access to individual ones of the data storage locations.

15. The apparatus of claim 12, wherein the memory, the wireless transceiver, the logic, and the virtual memory interface are implemented on a single semiconductor chip.

16. A method, comprising:
fetching a list of buffer reference elements each of which comprises (i) a respective buffer pointer corresponding to a respective one of physical addresses of data storage locations in a memory and (ii) a respective buffer size;
ordering ones of the physical addresses into a continuous sequence of virtual addresses in accordance with the list of buffer reference elements;
receiving a virtual address by a direct memory access (DMA) controller and determining an associated physical address within said DMA controller according to the ordered physical addresses wherein under control of a state machine within said DMA controller the virtual address is stored in an index register and an associated list pointer is stored in a descriptor register, wherein said state machine loads a physical reference address and buffer length through said list pointer and determines a physical address using said index register, said loaded physical reference address; and performing data transfer operations with respect to the target data storage locations from or to said memory by means of said DMA controller using said physical address.

17. The method of claim 16, further comprising in response to receipt of the virtual address, selecting as a target physical address a physical address having a sequence position offset from a reference position in the sequence by an amount corresponding to an amount by which the virtual address is offset from a reference position in the flat memory linear addressing space.

18. The method of claim 17, wherein the selecting comprises incrementing a buffer address list index to an index value of the buffer reference element that comprises a buffer pointer to a target buffer encompassing the target physical address, and incrementing a buffer offset by an amount corresponding to an offset between the physical address of the target buffer and the target physical address.

19. The method of claim 16, wherein the accessing comprises in response to receipt of the virtual address in association with a data transfer request, using the virtual address to identify a target one of the physical addresses in a target buffer scattered in the memory and performing data transfer operations with respect to the data storage location at the target physical address.

20. The method of claim 16, further comprising building the list of buffer reference elements in accordance with a group of buffers scattered in the memory.

21. A method, comprising:

wirelessly transmitting and receiving packets of data;

storing packet data in buffers scattered in a memory that comprises data storage locations addressable by physical addresses;

associating with each of the stored packets a respective list of buffer reference elements each of which comprises (i) a respective buffer pointer to a respective buffer containing data of the packet and (ii) a size of the respective buffer; and providing access to individual ones of the data storage locations by means of a direct memory access (DMA) controller based on respective orderings of ones of the physical addresses into respective sequences in accordance with respective ones of the lists of buffer reference elements and on a respective indexing of each the ordered physical address sequences with consecutive virtual addresses in a flat memory linear addressing space, wherein for performing an access to the data storage locations using a virtual address, the DMA controller under control of a state machine within said DMA controller determines the physical address of a virtual address within the DMA controller by storing the virtual address in an index register and an associated list pointer in a descriptor register, wherein said state machine loads a physical reference address and buffer length through a selected buffer reference element and determines a physical address by determining an offset within the selected buffer using said index register, and performs said access using said physical address.

22. The method of claim 21, wherein in response to receipt of a respective one of the virtual addresses in association with a data transfer request with respect to a particular packet, resolving the received virtual address to a target one of the physical addresses based on the respective indexing, and performing data transfer operations with respect to the data storage location at the target physical address.

\* \* \* \* \*